(12) United States Patent
Echito et al.

(10) Patent No.: US 9,869,336 B2
(45) Date of Patent: Jan. 16, 2018

(54) ANCHOR FASTENER

(71) Applicant: Good Earth Lighting, Inc., Mount Prospect, IL (US)

(72) Inventors: Cory Echito, Ventura, CA (US); Alexander Kowalenko, Inverness, IL (US)

(73) Assignee: Good Earth Lighting, Inc., Mount Prospect, IL (US)

( * ) Notice: Subject to any disclaimer, the term of this patent is extended or adjusted under 35 U.S.C. 154(b) by 38 days.

(21) Appl. No.: 15/006,953

(22) Filed: Jan. 26, 2016

(65) Prior Publication Data

US 2016/0215810 A1 Jul. 28, 2016

Related U.S. Application Data

(60) Provisional application No. 62/107,719, filed on Jan. 26, 2015.

(51) Int. Cl.
| | |
|---|---|
| *F16B 25/00* | (2006.01) |
| *F16B 31/00* | (2006.01) |
| *F16B 13/00* | (2006.01) |
| *F16B 25/10* | (2006.01) |
| *F16B 43/00* | (2006.01) |

(52) U.S. Cl.
CPC ........ *F16B 25/0026* (2013.01); *F16B 13/002* (2013.01); *F16B 25/103* (2013.01); *F16B 31/00* (2013.01); *F16B 43/00* (2013.01)

(58) Field of Classification Search
CPC .... F16B 13/00; F16B 13/002; F16B 25/0026; F16B 25/103; F16B 31/00; F16B 31/021; F16B 43/00

USPC ......... 411/2, 5, 16, 378, 382, 387.1
See application file for complete search history.

(56) References Cited

U.S. PATENT DOCUMENTS

| | | | |
|---|---|---|---|
| 1,370,319 A | 3/1921 | Kennedy | |
| 3,170,361 A | 2/1965 | Vaughn | |
| 3,213,746 A | 10/1965 | Dwyer | |
| 3,283,641 A | 11/1966 | Wagner | |
| 3,651,734 A | 3/1972 | McSherry | |
| 3,706,139 A | 12/1972 | Brumlik | |
| 3,735,665 A | 5/1973 | Mortensen | |
| 3,770,036 A | 11/1973 | Sherman | |
| 3,869,959 A | 3/1975 | Moen | |
| 3,959,853 A | 6/1976 | Talan | |
| 4,309,136 A | 1/1982 | Talan | |
| 4,601,625 A | 7/1986 | Ernst et al. | |
| 4,770,583 A | 9/1988 | Lindberg | |
| 4,878,791 A | 11/1989 | Kurihara et al. | |
| 4,886,405 A | 12/1989 | Blomberg | |
| 5,007,780 A | 4/1991 | Hoffmann et al. | |
| 5,160,225 A * | 11/1992 | Chern ................. | F16B 13/002 408/203.5 |
| 5,219,452 A | 6/1993 | Yamamoto | |

(Continued)

*Primary Examiner* — Roberta S Delisle
(74) *Attorney, Agent, or Firm* — Drinker Biddle & Reath LLP

(57) ABSTRACT

An anchor fastener includes a head, a generally cylindrical shaft extending from the head, and a base at a distal end of the shaft. The shaft includes a helical thread on an outer surface and a self-drilling tip at its distal end adjacent the base. The base is frangibly connected to the distal end of the shaft by at least one web of frangible material separable from at least one of the base and the shaft under application of a force to the shaft.

19 Claims, 8 Drawing Sheets

(56) References Cited

U.S. PATENT DOCUMENTS

| | | | | |
|---|---|---|---|---|
| 5,226,768 | A | 7/1993 | Speer | |
| 5,234,299 | A | 8/1993 | Giannuzzi | |
| 5,267,423 | A | 12/1993 | Giannuzzi | |
| 5,275,519 | A | 1/1994 | Hainke et al. | |
| 5,308,203 | A * | 5/1994 | McSherry | F16B 13/002 411/31 |
| 5,536,121 | A * | 7/1996 | McSherry | F16B 13/002 411/31 |
| 5,690,454 | A | 11/1997 | Smith | |
| 5,694,666 | A | 12/1997 | Hamamoto | |
| 5,833,415 | A * | 11/1998 | McSherry | F16B 13/002 411/31 |
| 5,876,169 | A | 3/1999 | Wrigley | |
| 6,065,918 | A | 5/2000 | Adams | |
| 6,164,884 | A | 12/2000 | Mayr | |
| 6,186,716 | B1 * | 2/2001 | West | F16B 13/002 411/30 |
| 6,406,236 | B1 | 6/2002 | Olson, Jr. | |
| 6,494,653 | B2 | 12/2002 | Remmers | |
| 6,679,661 | B2 | 1/2004 | Huang | |
| 6,926,483 | B2 | 8/2005 | Hesse et al. | |
| 7,070,376 | B1 | 7/2006 | Toback | |
| 7,137,766 | B2 | 11/2006 | Weinstein et al. | |
| 7,237,994 | B2 * | 7/2007 | Hepworth | F16B 13/002 411/29 |
| 7,261,505 | B2 | 8/2007 | Ernst et al. | |
| 7,290,972 | B2 * | 11/2007 | Gauthier | F16B 13/002 411/107 |
| 7,465,137 | B2 | 12/2008 | Dietz et al. | |
| 7,604,446 | B2 | 10/2009 | Fonti | |
| 7,615,407 | B1 | 11/2009 | Poddar et al. | |
| 7,654,781 | B2 | 2/2010 | McDuff et al. | |
| 7,713,010 | B2 | 5/2010 | Cheng | |
| 7,748,089 | B2 | 7/2010 | Jalbert et al. | |
| 7,815,407 | B2 | 10/2010 | Kucharyson | |
| 7,934,895 | B2 * | 5/2011 | Ernst | F16B 13/002 411/29 |
| 8,057,147 | B2 | 11/2011 | Ernst et al. | |
| 8,070,405 | B2 | 12/2011 | Hazout | |
| 8,142,122 | B2 | 3/2012 | McDuff et al. | |
| 8,376,679 | B2 | 2/2013 | Gaudron et al. | |
| 8,404,065 | B2 | 3/2013 | Miller | |
| 8,602,703 | B1 | 12/2013 | Rich | |
| 8,740,527 | B2 | 6/2014 | Cheng | |
| 2005/0084360 | A1 * | 4/2005 | Panasik | F16B 37/127 411/44 |
| 2005/0271491 | A1 | 12/2005 | Opper | |
| 2006/0120822 | A1 * | 6/2006 | Kaye | F16B 13/001 411/30 |
| 2006/0165506 | A1 * | 7/2006 | Panasik | F16B 13/002 411/30 |
| 2006/0228188 | A1 | 10/2006 | Hsu et al. | |
| 2008/0292421 | A1 | 11/2008 | Lin | |
| 2012/0183372 | A1 * | 7/2012 | Roessner | F16B 37/122 411/395 |
| 2012/0257944 | A1 | 10/2012 | McDuff et al. | |
| 2012/0328392 | A1 | 12/2012 | Difante | |
| 2014/0225486 | A1 | 8/2014 | English | |

* cited by examiner

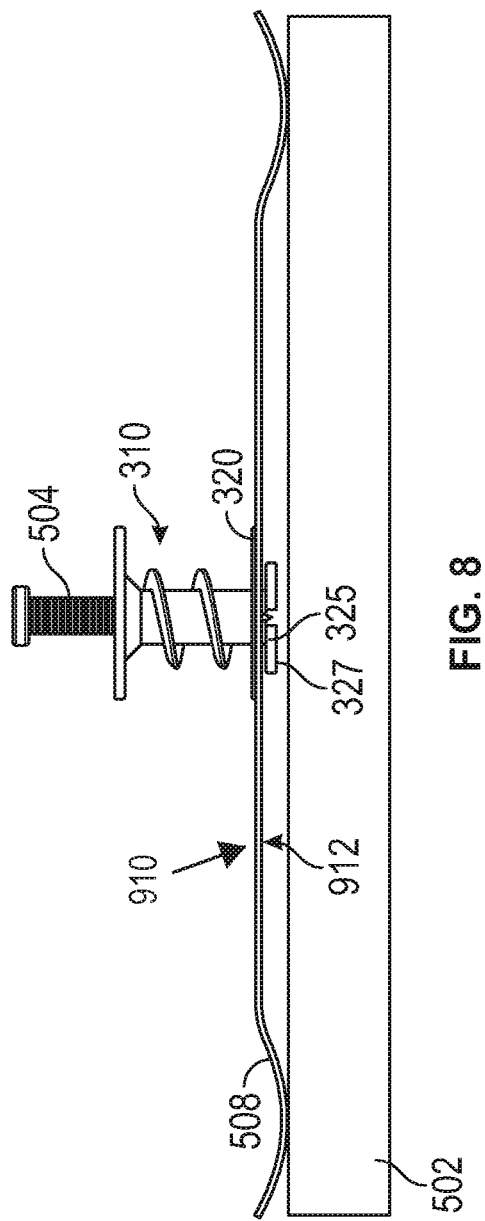
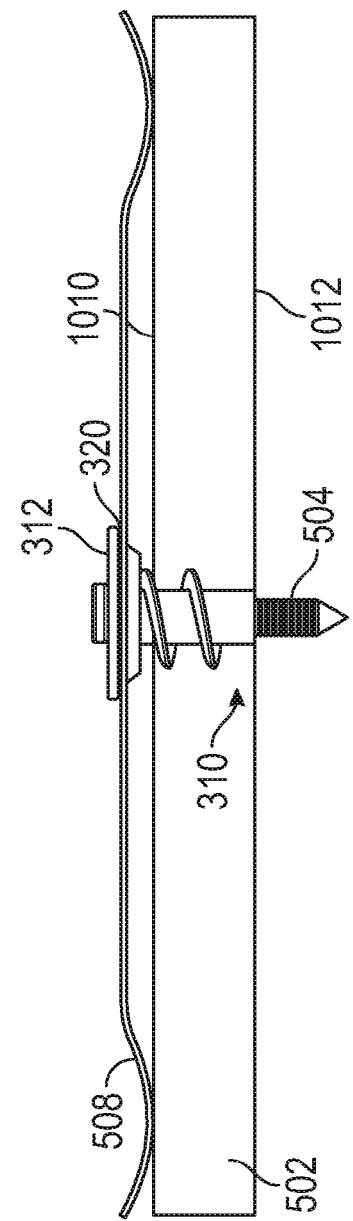
FIG. 8
FIG. 9

ANCHOR FASTENER

CROSS-REFERENCE TO RELATED PATENT APPLICATION

This disclosure claims the benefit of U.S. Provisional Patent Application No. 62/107,719, filed Jan. 26, 2015, entitled "Anchor Fastener," the disclosure of which is hereby expressly incorporated herein by reference in its entirety.

FIELD OF THE DISCLOSURE

The present disclosure relates generally to fastening devices and, more particularly, to anchor fasteners for drywall applications.

BACKGROUND

Current industry practices for installing a fixture (e.g., a lighting fixture, electrical fixture, etc.) to a mounting surface, such as a wall, ceiling, or other suitable surface, include attaching a portion of the fixture (e.g., a center portion) to an electrical junction box ("J-box") that is coupled with or contained within the mounting surface. For installation of some fixtures, for example, large and/or heavy fixtures, one or more additional fasteners are installed separately from the J-box to more securely attach the fixture to the mounting surface. For residential and other fixtures which are intended to be installed onto a surface made of drywall, plaster board, or other suitable material, the fixtures are configured to be attached with suitable fasteners and drywall anchors for additional support. For example, linear type lighting fixtures have an elongated shape that extends away from the J-box and are often configured to be attached to the mounting surface using screws and drywall anchors.

Drywall anchors are typically installed into the mounting surface before mounting the fixture. Installation of the drywall anchors typically involves i) measuring and marking locations of the drywall anchors on the mounting surface, ii) drilling pilot holes in the mounting surface for the drywall anchors, iii) installing the drywall anchors into the pilot holes, iv) installing the fixture to the j-box and orienting the fixture relative to the drywall anchors, and v) installing anchor screws through anchor holes in the fixture and into the drywall anchors. It is often difficult and/or time-consuming to pre-measure and locate the drywall anchor on the mounting surface so that the fixture is aligned properly in the installation of the fixture. For example, each of steps i) through v) may require a user to ascend and descend a ladder to reach the J-box, retrieve fasteners and/or tools, etc. This can result in the anchor holes of the fixture being misaligned with the drywall anchors. Some drywall anchors penetrate beyond a back or distal face of the mounting surface due to their length. In this case, the drywall anchor may not be fully installed if a stud or other support structure within the wall is present (e.g., it cannot penetrate into a stud or support structure) and the drywall anchor may tear a hole into the mounting surface when it hits the stud and deflects.

SUMMARY

In an embodiment, an anchor fastener includes a head, a generally cylindrical shaft extending from the head, and a base at a distal end of the shaft. The shaft includes a helical thread on an outer surface and a self-drilling tip at its distal end adjacent the base. The base is frangibly connected to the distal end of the shaft by at least one web of frangible material separable from at least one of the base and the shaft under application of a force to the shaft.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 8 is a diagram illustrating a side view of the anchor fastener of FIG. 6 prior to installation in the mounting surface, according to an embodiment;

FIG. 9 is a diagram illustrating a side, cross-sectional view of the anchor fastener of FIG. 6 after installation in the mounting surface, according to an embodiment;

DETAILED DESCRIPTION

Figure 1:
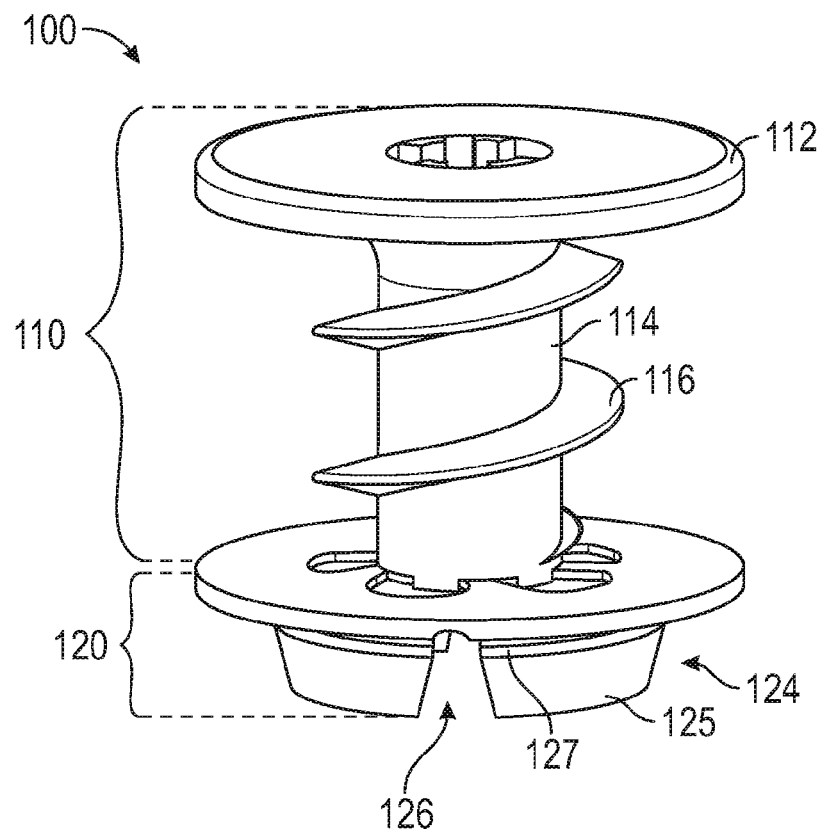
FIG. 1 is a diagram illustrating a side, perspective view of an anchor fastener, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Figure 2:
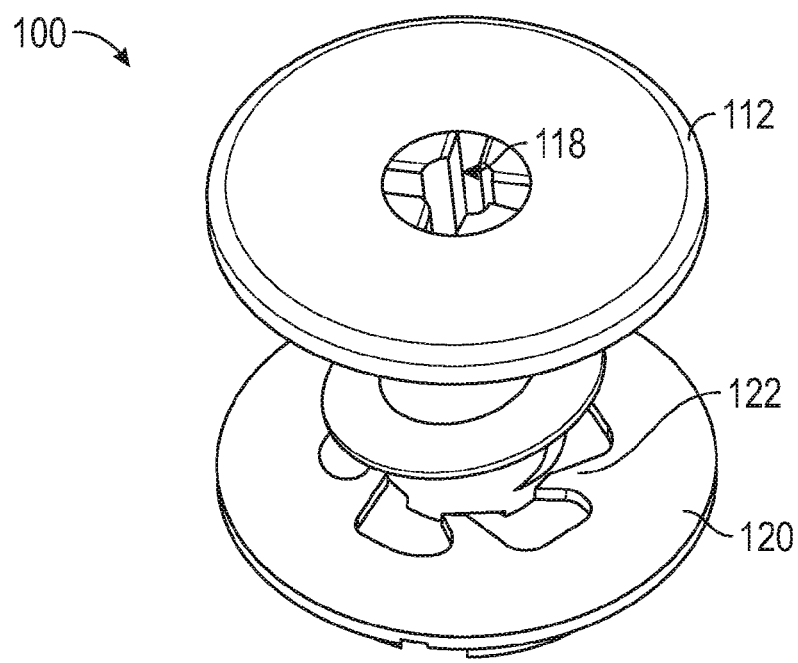
FIG. 2 is a diagram illustrating a top, perspective view of the anchor fastener of FIG. 1, according to an embodiment.
Figure 3:
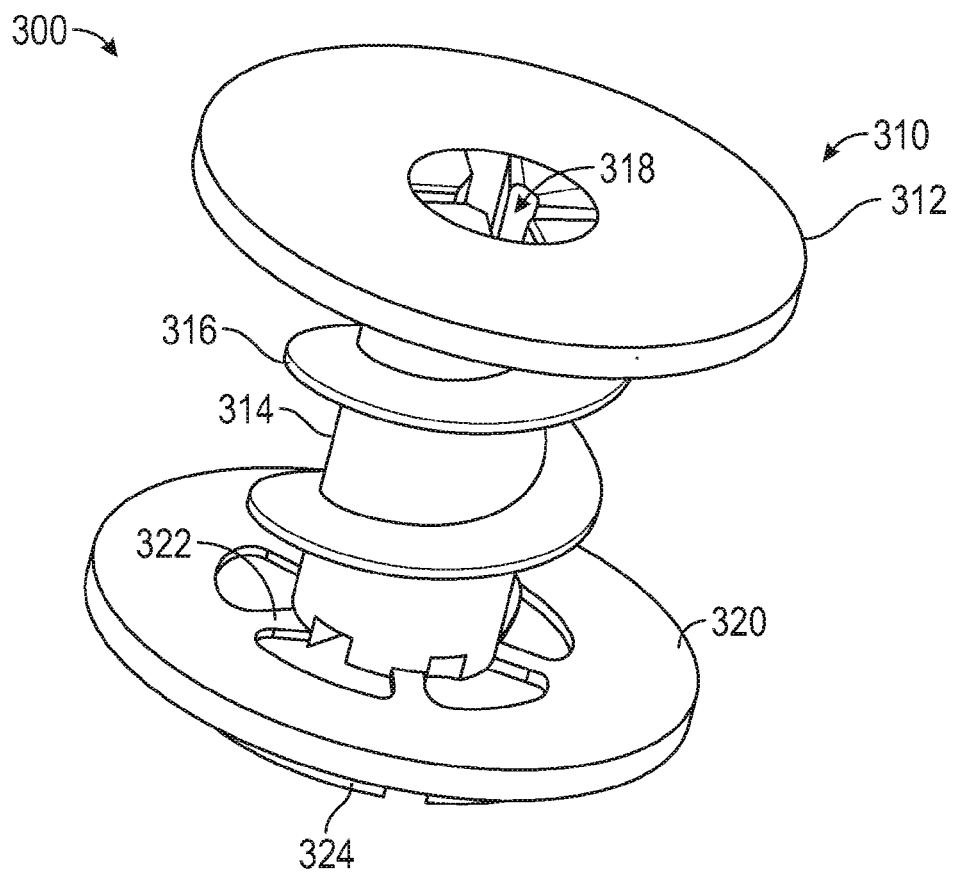
FIG. 3 is a diagram illustrating a side, perspective view of an anchor fastener, according to another embodiment.
Figure 4:
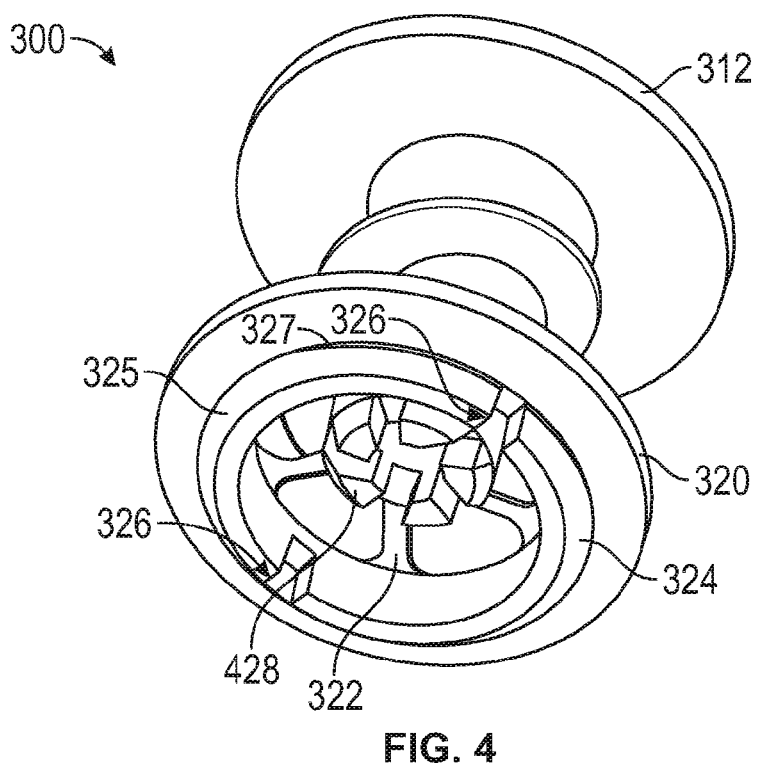
FIG. 4 is a diagram illustrating a bottom, perspective view of the anchor fastener of FIG. 3, according to an embodiment.

FIG. 1 is a diagram illustrating a side, perspective view of an anchor fastener 100, according to an embodiment. FIG. 2 is a diagram illustrating a top, perspective view of the anchor fastener 100 of FIG. 1. FIG. 3 is a diagram illustrating a side, perspective view of another embodiment of an anchor fastener 300. FIG. 4 is a diagram illustrating a bottom, perspective view of the anchor fastener 300 of FIG. 3. In various embodiments, the anchor fastener 100 or 300 is a pre-assembled anchor with a threaded fastener for installation of an object or fixture onto a mounting surface. Examples of mounting surfaces include, but are not limited to walls, ceilings, panels, or other suitable surfaces which are formed from drywall, wallboard, wood, plywood, fiberboard, particle board, composite material, or other suitable material. In the illustrated embodiments, the pre-assembled anchor is attached to an object or fixture prior to attachment of the fixture to a J-box and thus eliminates a need for pre-installation of a separate drywall anchor (e.g., marking and drilling pilot holes) when installing the fixture. Examples of fixtures include light fixtures, electrical fixtures, decorative fixtures, or other suitable fixtures. An attachment face of the object to be installed includes an anchor hole configured to receive the anchor fastener. The attachment face of the object is formed of sheet metal, plastic, or other suitable material. While the description herein refers to installation or attachment of a fixture, in other embodiments, the anchor fastener is used to attach an object to the mounting surface, such as a picture frame, mirror, wall hook, shelf, or other suitable object.

The anchor fastener 100, 300 includes an anchor body 110, 310 and an anchor base 120, 320. In some embodiments, the anchor fastener 100, 300 also includes a threaded fastener 504 (FIGS. 5, 6, 7, 8, 9, 10, and 11), such as a screw, bolt, or other suitable threaded fastener. The anchor body 110, 310 is removably attached to the anchor base 120, 320. In the illustrated embodiments, the anchor body 110, 310 is configured to break away or detach from the anchor base 120, 320 during installation of the anchor fastener 100, 300. The anchor base 120, 320 remains in place during at least an initial installation of the anchor fastener 100, 300.

In the illustrated embodiments, the anchor body 110, 310 includes an anchor head 112, 312 and a generally cylindrical anchor shaft 114, 314 extending from the anchor head 112, 312. The base 120, 320 is located at a distal end of the shaft 114, 314. The anchor shaft 114, 314 has a suitable length such that when the anchor body 110, 310 is installed (See FIG. 10) and passes through the anchor base 120, 320, the anchor shaft 114, 314 extends through a proximal face of the mounting surface but does not extend past a distal face of the mounting surface. In some embodiments, the anchor shaft 314 includes a tip 428 at its distal end which is configured for self-drilling of a hole in the mounting surface into which the anchor shaft is inserted. The anchor shaft 114, 314 includes one or more helical threads 116, 316 on an outer surface configured to engage the mounting surface and drive the anchor shaft 114, 314 into the mounting surface. The helical threads 116, 316 engage the drywall and hold the anchor shaft 114, 314 in place in the mounting surface after drilling.

In some embodiments, the anchor head 112, 312 and anchor shaft 114, 314 include a center channel 118, 318 configured to guide a threaded fastener into the mounting surface. In the illustrated embodiments, the center channel 118, 318 extends entirely through the anchor head 112, 312 and anchor shaft 114, 314. In other embodiments, the center channel 118, 318 extends a suitable distance from the anchor head 112, 312 through the anchor shaft 114, 314 towards the anchor base 120, 320 such that the threaded fastener can puncture or drill through a remainder of the anchor shaft 114, 314 into the mounting surface during installation (e.g., a user applying an installation force to the threaded fastener). In some embodiments, the anchor head 112, 312 is configured to receive a driving device (e.g., Phillips or flat-head screwdriver, hex bit, star bit, or other suitable drive mechanism) for removal of the anchor body after an initial installation. For example, the anchor head 112, 312 includes a socket or other receptacle.

In the embodiments shown in FIGS. 1, 2, 3, and 4, the anchor base 120, 320 is mechanically coupled with the anchor body 110, 310 by a plurality of bridges or webs 122, 322. The plurality of webs 122, 322 include a suitable number of webs (e.g., 2, 3, 4, 5, or more) that are configured with a suitable thickness such that an installation force provided by a user causes the webs 122, 322 to break away, shear, or otherwise separate from the anchor base, the anchor shaft, or both the anchor base and anchor shaft. For example, the anchor base is frangibly connected to a distal end of the anchor shaft 114, 314, and can be separated therefrom by application of at least one of a rotational force or a linear force. In some embodiments, an installation force causes i) a separation of the webs 122, 322, and ii) causes the self-drilling tip 428 to engage and drill into the mounting surface, and iii) installation of the anchor shaft 114, 314 into the mounting surface.

After the webs 122, 322 have separated, the anchor body 110, 310 is generally free to rotate within the anchor base 120, 320 and thus advance through the anchor base 120, 320 to screw into the mounting surface. The webs 122, 322 maintain the anchor body 110, 310 in a mounting position over the anchor hole of the fixture, for example, during manufacture and/or shipment of the fixture. In other embodiments, the anchor base 120, 320 is configured to removably engage the anchor body 110, 310, for example, using a snap-fit engagement, friction-fit or press-fit engagement, or other suitable engagement mechanism.

In various embodiments, the anchor base 120, 320 is a flat, annular ring configured to abut the object, for example, a proximal surface around an anchor hole of the object. The anchor base 120, 320 includes an engagement portion 124, 324 configured to attach the anchor fastener 100, 300 to the object, for example, to an anchor hole of a fixture. In the embodiment shown in FIGS. 1, 2, 3, and 4, the engagement portion 124, 324 includes an annular ridge 125, 325 having one or more slots 126, 326 configured to provide a snap-fit engagement with the anchor hole of the fixture. For example, the annular ridge 125, 325 elastically deforms inwardly toward a center axis of the anchor base 120, 320 (e.g., towards the center channel 118, 318) when inserted through the anchor hole of the fixture and generally "snaps back" to an original shape after passing through the anchor hole. In some embodiments, the annular ridge 125, 325 includes an outwardly facing lip 127, 327 (e.g., extending away from the center axis of the anchor base 120, 320) that engages a distal surface of the anchor hole. While only two slots 326 are shown in FIG. 4, the engagement portion 324 includes additional or fewer slots or alternatively, engagement tabs having suitable sizes, in other embodiments. In alternative embodiments, the engagement portion 324 is configured for a friction-fit or press-fit engagement to the fixture.

In some embodiments, the anchor fastener 100, 300 is formed from a plastic material, such as nylon, polyoxymethylene, polypropylene, acrylonitrile butadiene styrene (ABS), polycarbonate, or other suitable material. In other embodiments, the anchor fastener 100, 300 is formed from metal, such as brass, aluminum, or steel. As illustrated in the figures, the anchor base 120, 320 and anchor body are integrally formed as a single structure. In other embodiments, the anchor base 120, 320 and anchor body 110, 310 are formed separately and coupled with each other after their formation. In one such embodiment, the anchor base 120, 320 and anchor body are formed of different materials.

In various embodiments, the anchor fastener 100, 300 is configured to be installed into the mounting surface without a separate step of installing drywall anchors into the mounting surface prior to mounting the fixture. The anchor fastener 100, 300 is configured to be installed into the mounting surface after the fixture has been secured to the J-box and after proper alignment of the fixture. This helps to reduce and/or eliminate one or more of misalignment of anchor holes in the fixture with drywall anchors, misalignment of the fixture due to inaccurate measurements, and handling of multiple fasteners and tools by a user while on a ladder during installation. For example, some electrical fixtures include two or more drywall anchors, each drywall anchor having two parts: an anchor that is inserted into the drywall and a screw that attaches the fixture to the drywall anchor. In this example, there are four loose parts that could potentially be dropped (and lost) by a user from the top of the ladder during installation, resulting in an increased safety hazard of going up and down the ladder.

Figure 5:
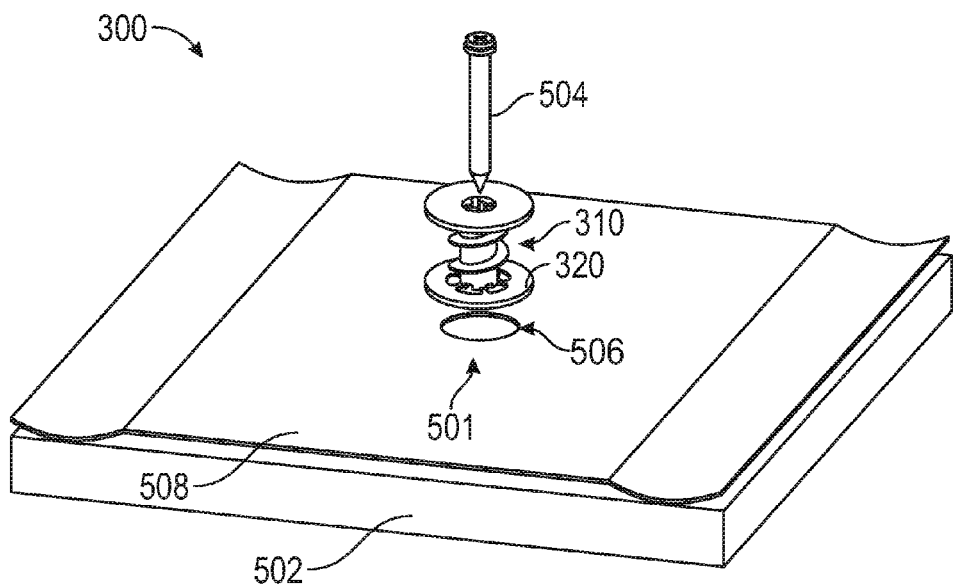
FIG. 5 is a diagram illustrating an exploded side, perspective view of the anchor fastener of FIG. 3 prior to installation in a mounting surface, according to an embodiment.

FIG. 5 is a diagram illustrating an exploded, side, perspective view of the anchor fastener 300 of FIG. 3 prior to installation at a location 501 in a mounting surface 502, according to an embodiment. As illustrated in FIG. 5, the anchor fastener 300 includes a threaded fastener 504, such as a screw, bolt, or other suitable fastener. As one example, the threaded fastener 504 is a #8×1.25" Pan Philips Type AB Self Tapping Screw. In some embodiments, the threaded fastener 504 is pre-installed within the center channel 318 of the anchor body 310. For example, the threaded fastener 504 is at least partially inserted into the center channel 318 of the anchor body 310. In some embodiments, the anchor base 320 is pre-installed within an anchor hole 506 of a fixture 508 which is to be attached to the mounting surface 502.

In some embodiments, the anchor body 310 and threaded fastener 504 are configured to be installed into a mounting surface 502 with a wall support (e.g., a stud, brace or other suitable structure, not shown). For example, the anchor shaft 314 has a suitable length (e.g., ½" or ¾") such that when the anchor body 310 is installed (See FIG. 10) and passes through the anchor base 320, the anchor shaft 314 does not extend past a distal face of the mounting surface 502 while the threaded fastener 504 (e.g., a self-tapping screw) screws itself into the stud and thus provides additional support.

In some embodiments, the threaded fastener 504 and center channel 318 are configured to transfer at least a portion of a rotational force imparted on the threaded fastener 504 to the anchor body 310. For example, a rotational force applied to the threaded fastener 504 by a user with a screw driver or other driving device is transferred to the anchor body 310 through a friction fit, press fit, threaded engagement fit, or other suitable engagement mechanism. Accordingly, as the user drives the threaded fastener 504 into the mounting surface 502, and optionally, into a stud (not shown) behind the mounting surface 502, the rotation of the threaded fastener 504 is transferred to the anchor body 310, causing the tip 428 and/or anchor threads 316 to engage and install the anchor body 310 into the mounting surface 502.

Figure 6:
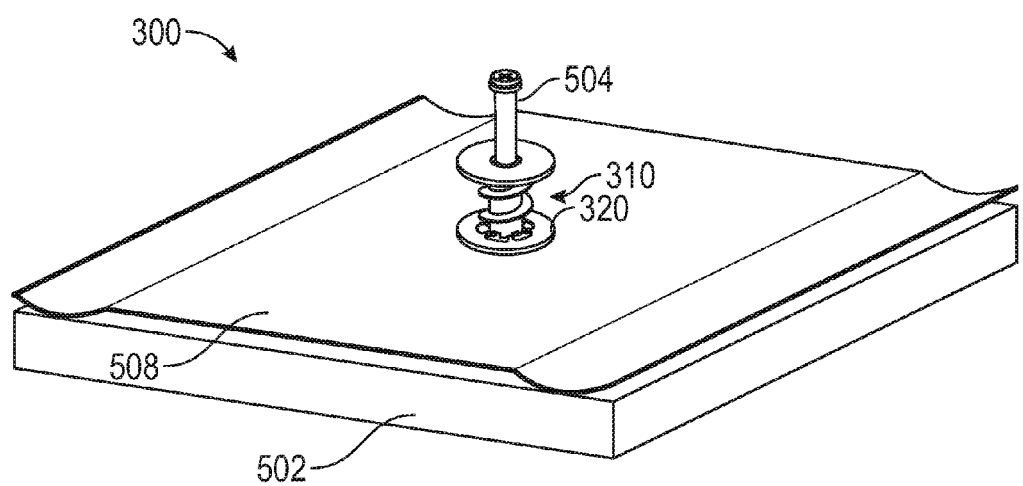
FIG. 6 is a diagram illustrating a side, perspective view of the anchor fastener of FIG. 3 prior to installation in the mounting surface, according to an embodiment.
Figure 7:
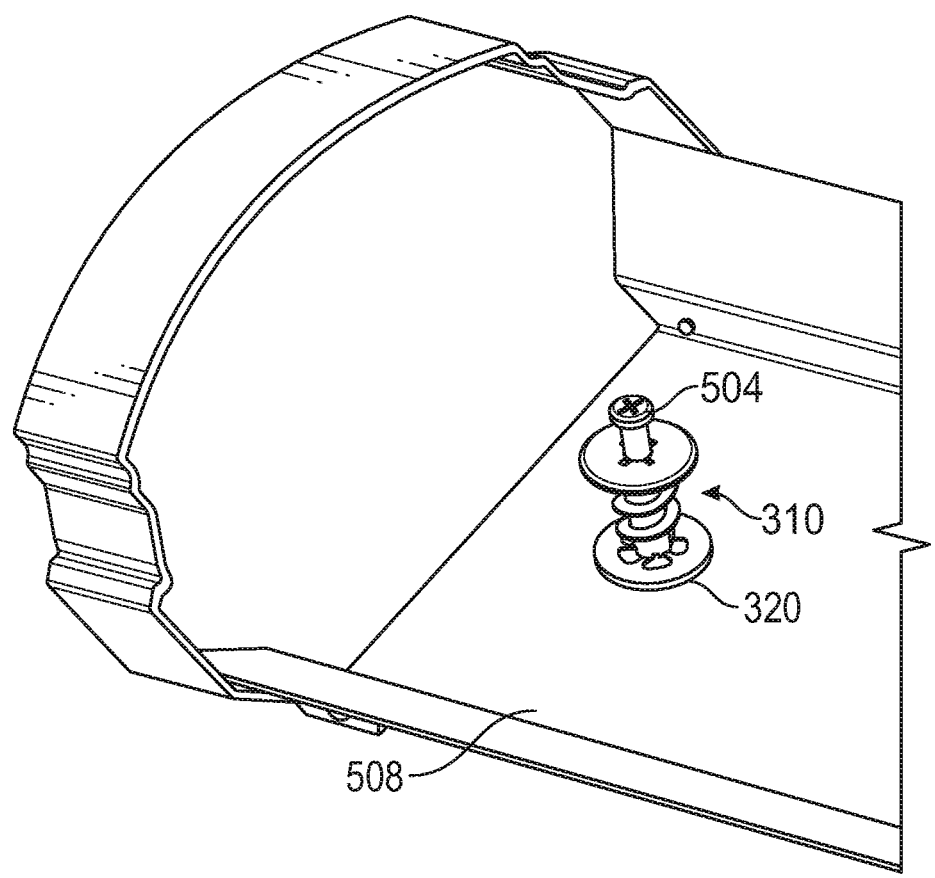
FIG. 7 is a diagram illustrating another top, perspective view of the anchor fastener of FIG. 6 prior to installation in the mounting surface, according to an embodiment.

FIG. 6 is a diagram illustrating a side, perspective view of the anchor fastener 300 prior to installation in the mounting surface 502, according to an embodiment. FIG. 7 is a diagram illustrating another top, perspective view of the anchor fastener 300 of FIG. 6 prior to installation in the mounting surface 502. FIG. 8 is a diagram illustrating a side view of the anchor fastener 300 of FIG. 6 prior to installation in the mounting surface 502. The anchor fastener 300 is shown with the anchor base 320 coupled to the fixture 508 and the threaded fastener 504 partially inserted into the center channel 318 of the anchor body 310. In some embodiments, the anchor fastener 300 is pre-installed within the fixture 508 as shown in FIG. 6 prior to a sale or shipment of the fixture 508. In the embodiment shown in FIG. 6, the base 320 abuts a proximal surface 910 around the anchor hole 506 of the object 508, the annular ridge 325 extends through the anchor hole 506, and the outwardly facing lip 327 engages a distal surface 912 of the anchor hole 506.

A user performs an installation of the anchor fastener 300 by engaging a driver device (e.g., a screw driver) with a head of the threaded fastener 504. The user provides an installation force to the driver device, for example, pushing and/or rotating the driver device to cause the webs 322 to break. After the webs 322 have broken, the installation force causes the threaded fastener 504 and the anchor body 310 to rotate. Rotation of the anchor body 310 causes the self-drilling tip 428 of the anchor shaft 314 to drill into the mounting surface 502. In some embodiments, the threaded fastener 504 is partially inserted or screwed into the mounting surface 502 before the webs 322 are separated. For example, the threaded fastener 504 is inserted through the center channel 318 and into the mounting surface 502, receives an installation force, and advances through the center channel 318 of the shaft during installation of the anchor fastener 300 until a head of the threaded fastener 504 engages the anchor head 312 and stops the advance of the threaded fastener 504 through the center channel 318. Upon engagement of the head of the threaded fastener 504 and the anchor head 312, the installation force is transferred to the anchor head 312 and the webs 322 are separated, as described above.

FIG. 9 is a diagram illustrating a side, cross-sectional view of the anchor fastener 300 of FIG. 6 after installation in the mounting surface 502, according to an embodiment. As illustrated in FIG. 9, the anchor shaft 314 is separated from the webs 322 of the anchor base 320 and secured into the mounting surface 502 by the helical threads 316. The anchor shaft 314 extends through a proximal face 1010 of the mounting surface but does not extend past a distal face 1012 of the mounting surface 502. The anchor head 312 abuts the anchor base 320 and prevents insertion of the anchor body 310 beyond the distal face 1012 of the mounting surface 502. In some embodiments, a lateral dimension of the anchor head 312 is greater than a maximum lateral dimension of the anchor shaft 314, which limits penetration of the anchor fastener 300 into the mounting surface 502. In an embodiment, an installation force suitable for driving the threaded fastener 504 into a stud or wall support structure is sufficient to break the webs 322 that couple the anchor base 320 to the anchor body 310.

In some embodiments, the threaded fastener 504 is removable after installation, for example, using a screwdriver, driving device, or other suitable extraction tool. The anchor body 310 is removable from the mounting surface, for example, using a screwdriver or other suitable extraction tool. In some embodiments, the threaded fastener 504 and the anchor body 310 have a same socket or receptacle configuration (e.g., Phillips, hex, etc.) or are otherwise configured for removal using a same tool.

Figure 10:
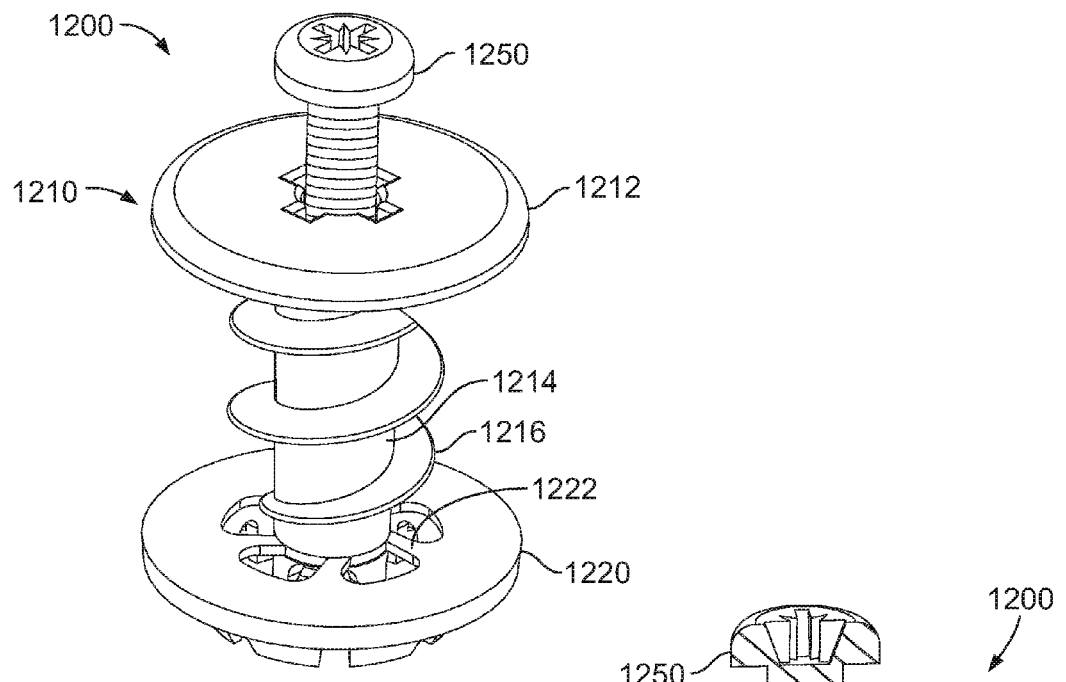
FIG. 10 is a diagram illustrating a side, perspective view of an anchor fastener with a threaded fastener, according to another embodiment.
Figure 11:
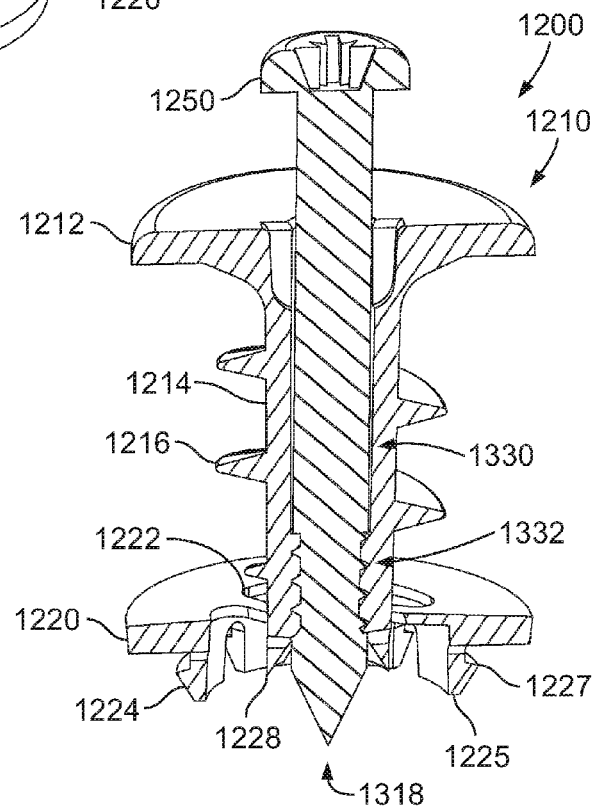
FIG. 11 is a diagram illustrating a side, perspective view, in cross-section, of the anchor fastener and threaded fastener of FIG. 10, according to an embodiment.
Figures 12, 13:
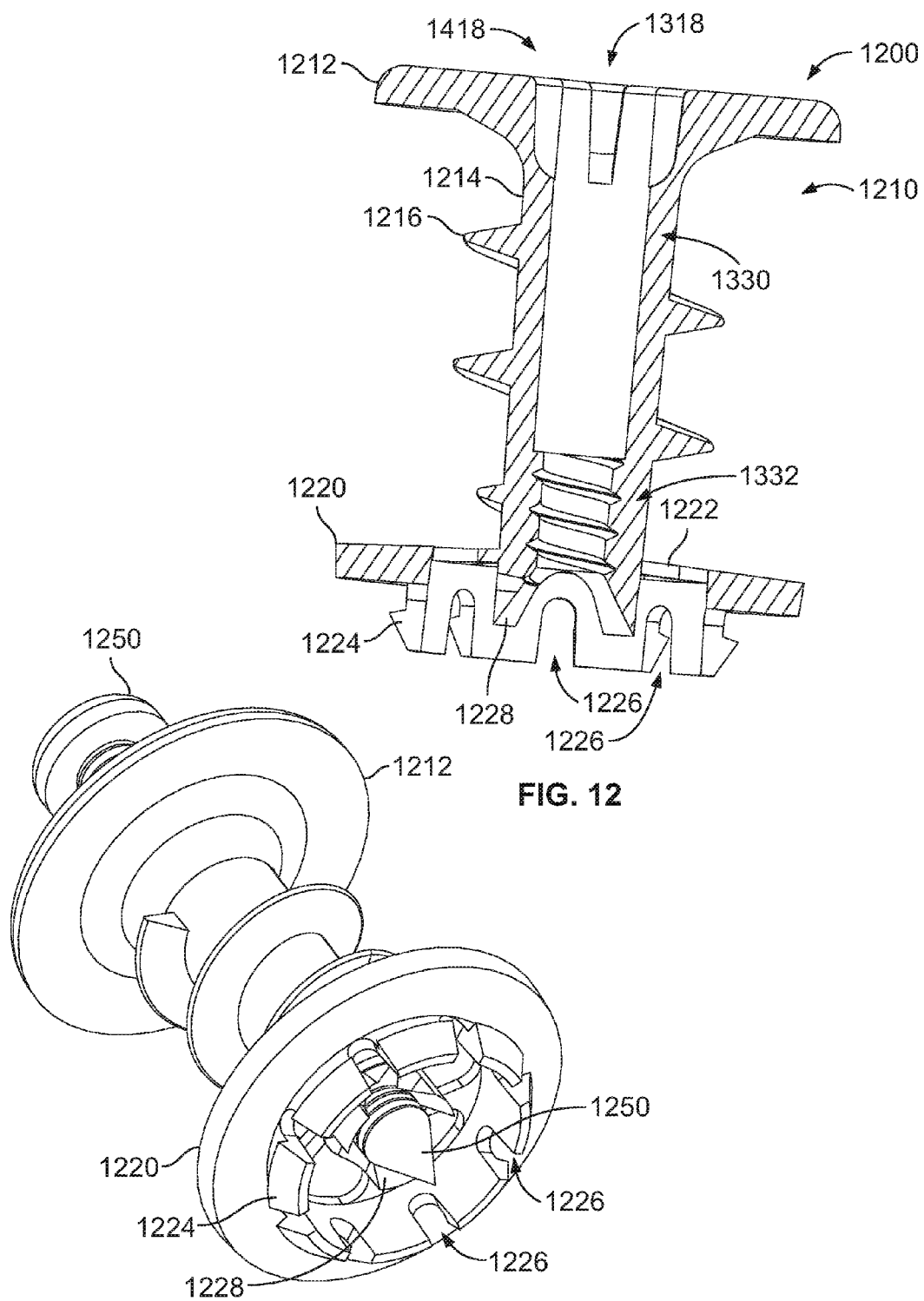
FIG. 12 is a diagrams illustrating a side, perspective view, in cross-section, of the anchor fastener of FIG. 10, according to an embodiment.
FIG. 13 is a diagram illustrating a bottom, perspective view of the anchor fastener and threaded fastener of FIG. 10, according to an embodiment.
Figure 14:
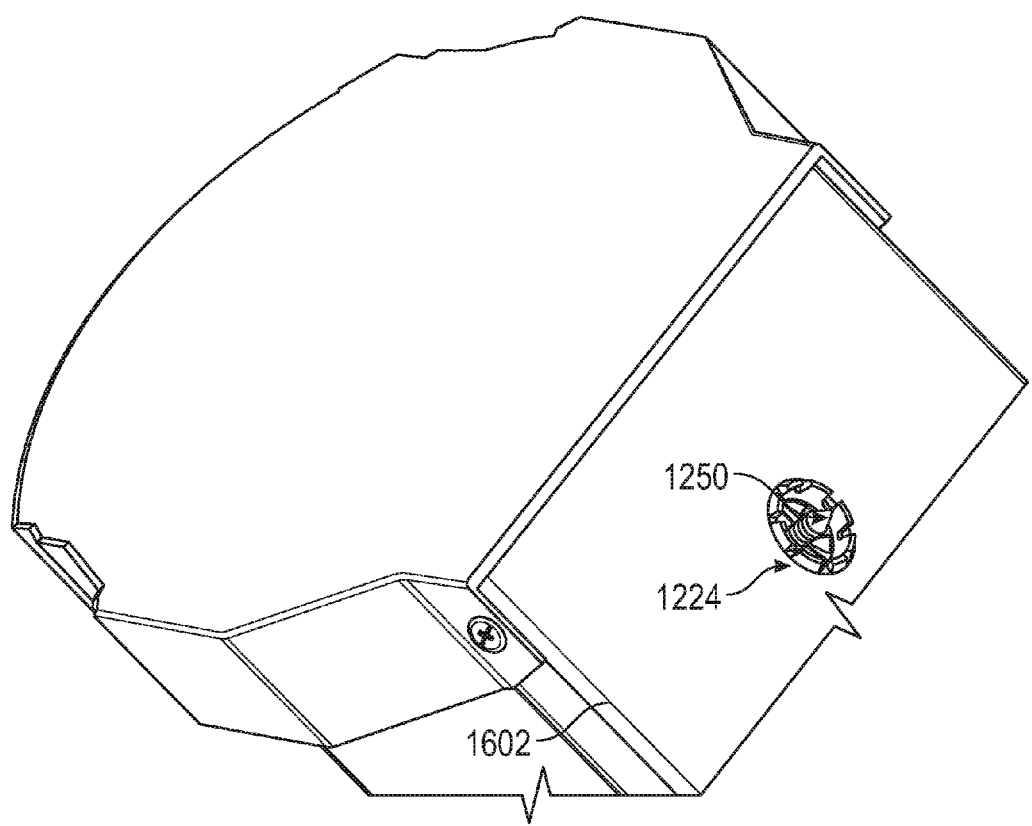
FIG. 14 is a diagram illustrating a bottom, perspective view of the anchor fastener and threaded fastener of FIG. 10 prior to installation in a mounting surface, according to an embodiment.

FIG. 10 is a diagram illustrating a side, perspective view of an anchor fastener 1200 with a threaded fastener 1250, according to another embodiment. FIG. 11 is a diagram illustrating a side, perspective view, in cross-section, of the anchor fastener 1200 and threaded fastener 1250 of FIG. 10, according to an embodiment. FIG. 12 is a diagram illustrating a side, perspective view, in cross-section, of the anchor fastener 1200 of FIG. 10, according to an embodiment. FIG. 13 is a diagram illustrating a bottom, perspective view of the anchor fastener 1200 and threaded fastener 1250 of FIG. 10, according to an embodiment. FIG. 14 is a diagram illustrating a bottom, perspective view of the anchor fastener 1200 and threaded fastener 1250 of FIG. 10 coupled to a fixture 1602 prior to installation in a mounting surface (not shown), according to an embodiment.

The anchor fastener 1200 includes an anchor body 1210 and an anchor base 1220 at a distal end of the anchor body 1210. The anchor body 1210 includes an anchor head 1212 and an anchor shaft 1214 having one or more helical threads 1216 and a self-drilling tip 1228. The anchor base 1220 is coupled to the anchor shaft 1214 of the anchor body 1210 by one or more frangible webs 1222. The anchor body 1210 includes a center channel 1318 configured to guide the threaded fastener 1250 into the mounting surface.

In the illustrated embodiment, the center channel 1318 includes a receptacle 1418, an unthreaded portion 1330, and a threaded portion 1332. The receptacle 1418 is configured to receive a driving device (e.g., Phillips or flat-head screwdriver, hex key or hex bit, star bit, or other suitable drive mechanism) for removal of the anchor body 1210 after an initial installation. For example, the receptacle 1418 is a Phillips compatible slot, a flat-head slot, or a hexagonal shape. As another example, the receptacle 1418 has a star shape having four, five, six, or another suitable number of points. The threaded portion 1332 provides a threaded engagement fit with the threaded fastener 1250 to secure the threaded fastener 1250 prior to installation. In some embodiments, the unthreaded portion 1330 provides a reduced friction area within the center channel 1318 to reduce an installation force required to install the threaded fastener 1250. In other embodiments, the unthreaded portion 1330 is omitted and the threaded portion 1332 extends along an entire length, or substantially the entire length, of the center channel 1318.

The anchor base 1220 is a flat, annular ring and includes an engagement portion 1224 configured to attach the anchor fastener 1200 to the fixture 1602. In the embodiment shown in FIGS. 10, 11, 12, 13, and 14, the engagement portion 1224 includes an annular ridge 1225 having one or more slots 1226 configured to provide a snap-fit engagement with an anchor hole (not shown) of the fixture 1602. In some embodiments, the annular ridge 1225 includes an outwardly facing lip 1227 that engages a distal surface of the anchor hole.

It can be seen from the foregoing that an anchor fastener has been described. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An anchor fastener comprising:
    a head, a generally cylindrical shaft extending from the head, and a base at a distal end of the shaft;
    the shaft including a helical thread on an outer surface and a self-drilling tip at its distal end adjacent the base;
    the base being frangibly connected to the distal end of the shaft by at least one web of frangible material separable from at least one of the base and the shaft under application of a force to the shaft;
    wherein the base includes a distal surface and an engagement portion configured to engage an object to be anchored to a mounting surface and configured to hold the anchor fastener to the object before installation of the shaft through the object and into the mounting surface;
    wherein the distal surface of the base extends away from a center axis of the shaft beyond an anchor hole of the object and is configured to abut a proximal surface of the object around the anchor hole.

2. The anchor fastener of claim 1, wherein the force is an installation force that causes i) a separation of the at least one web, and ii) installation of the shaft into the mounting surface.

3. The anchor fastener of claim 2, wherein the installation force is a rotational force that causes the self-drilling tip to engage and drill into the mounting surface.

4. The anchor fastener of claim 2, wherein the anchor fastener has a center channel that i) extends through and is generally coaxial with the shaft and the head and ii) is configured to receive a threaded fastener.

5. The anchor fastener of claim 4, wherein the center channel of the shaft has a threaded portion that provides a threaded engagement fit with the threaded fastener.

6. The anchor fastener of claim 5, wherein the center channel of the shaft has a non-threaded portion between the threaded portion and the head.

7. The anchor fastener of claim 4, wherein the center channel of the shaft provides a friction fit engagement with the threaded fastener.

8. The anchor fastener of claim 4, wherein:
the threaded fastener receives the installation force and advances through the center channel of the shaft during installation of the anchor fastener; and
the threaded fastener has a head that stops the advance of the threaded fastener through the center channel upon an engagement with the head of the anchor fastener.

9. The anchor fastener of claim 8, wherein the engagement of the head of the threaded fastener and the head of the anchor fastener causes a transfer of the installation force from the threaded fastener to the anchor fastener.

10. The anchor fastener of claim 8, wherein the head of the anchor fastener has a receptacle at an end of the center channel for receiving a driving device during removal of the anchor fastener.

11. The anchor fastener of claim 10, wherein the head of the threaded fastener has a receptacle for receiving the driving device during installation of the anchor fastener.

12. The anchor fastener of claim 4 in combination with the threaded fastener.

13. A drywall anchor comprising:
a head, a generally cylindrical shaft extending from the head, and a base at a distal end of the shaft;
the shaft including a self-drilling tip at its distal end configured to drill into a drywall location and a helical thread on an outer surface of the shaft configured to engage the drywall and hold the shaft in place in the drywall after drilling;
the base including a distal surface and an engagement portion configured to engage an object to be anchored to the drywall location and configured to hold the anchor to the object before installation of the shaft through the object and into the drywall location, the base being connected to the distal end of the shaft by at least one web of frangible material configured to separate from at least one of the base and the shaft when a force is applied to the shaft for drilling into the drywall location;
the head being generally coaxial with the shaft and having a lateral dimension greater than a maximum lateral dimension of the shaft for limiting penetration of the anchor into the drywall during drilling;
wherein the distal surface of the base extends away from a center axis of the shaft beyond an anchor hole of the object and is configured to abut a proximal surface of the object around the anchor hole.

14. The drywall anchor of claim 13, wherein:
the drywall anchor has a center channel that extends through and is generally coaxial with the shaft and the head and
the center channel is configured to receive a threaded fastener.

15. The drywall anchor of claim 14, wherein the center channel has a threaded portion on an interior surface of the center channel that provides a threaded engagement fit with the threaded fastener.

16. The drywall anchor of claim 15, wherein the force applied to the shaft for drilling into the drywall location is transferred from a head of the threaded fastener to the head of the drywall anchor.

17. The drywall anchor of claim 13, wherein the force applied to the shaft for drilling into the drywall location is at least one of a rotational force or a linear force.

18. The drywall anchor of claim 13, wherein:
the distal surface of the base has a flat, annular ring;
the engagement portion has an annular ridge that extends through the anchor hole and engages a distal surface of the object around the anchor hole.

19. The drywall anchor of claim 18, wherein the annular ridge includes one or more slots that provide a snap-fit engagement of the base to the object.

* * * * *